(12) United States Patent
Ryoo et al.

(10) Patent No.: US 12,511,539 B2
(45) Date of Patent: Dec. 30, 2025

(54) COMPUTER VISION NEURAL NETWORKS WITH LEARNED TOKENIZATION

(71) Applicant: Google LLC, Mountain View, CA (US)

(72) Inventors: Michael Sahngwon Ryoo, Mountain View, CA (US); Anthony Jacob Piergiovanni, Nazareth, PA (US); Anelia Angelova, Sunnyvale, CA (US); Anurag Arnab, Grenoble (FR); Mostafa Dehghani, Amsterdam (NL)

(73) Assignee: Google LLC, Mountain View, CA (US)

(*) Notice: Subject to any disclaimer, the term of this patent is extended or adjusted under 35 U.S.C. 154(b) by 794 days.

(21) Appl. No.: 17/845,753

(22) Filed: Jun. 21, 2022

(65) Prior Publication Data
US 2023/0409899 A1 Dec. 21, 2023

(51) Int. Cl.
*G06N 3/08* (2023.01)
(52) U.S. Cl.
CPC ..................... *G06N 3/08* (2013.01)
(58) Field of Classification Search
None
See application file for complete search history.

(56) References Cited

U.S. PATENT DOCUMENTS

| | | | | |
|---|---|---|---|---|
| 7,748,022 B1 * | 6/2010 | Frazier | ............... | H04N 21/4223 348/207.1 |
| 11,921,824 B1 * | 3/2024 | Hester | ................. | G06N 3/045 |
| 2021/0042625 A1 * | 2/2021 | Chopra | .................. | G06N 3/045 |
| 2023/0186072 A1 * | 6/2023 | Le | ........................ | G06N 3/045 706/25 |
| 2023/0206645 A1 * | 6/2023 | Lee | ....................... | G06V 20/56 382/181 |
| 2023/0386203 A1 * | 11/2023 | Girdhar | .................. | G06V 20/10 |

OTHER PUBLICATIONS

Alayrac et al., "Self-supervised multimodal versatile networks," Advances in Neural Information Processing Systems (NeurIPS), Dec. 2020, 13 pages.
Arnab et al., "ViViT: A video vision transformer," Proceedings of the IEEE International Conference on Computer Vision (ICCV), Oct. 2021, pp. 6836-6846.
Bertasius et al., "Is space-time attention all you need for video understanding?" Presented at the Thirty-eighth International Conference on Machine Learning, Virtual, Jul. 18-24, 2021, 12 pages.
Beyer et al., "Are we done with imagenet?" arXiv, Jun. 12, 2020, 15 pages.
Carion et al., "End-to-end object detection with transformers," Proceedings of European Conference on Computer Vision (ECCV), Nov. 3, 2020, 17 pages.
Carreira et al., "Quo vadis, action recognition? A new model and the kinetics dataset," Proceedings of the IEEE Conference on Computer Vision and Pattern Recognition (CVPR), Jul. 2017, 10 pages.

(Continued)

*Primary Examiner* — Mandrita Brahmachari
(74) *Attorney, Agent, or Firm* — Fish & Richardson P.C.

(57) ABSTRACT

Methods, systems, and apparatus, including computer programs encoded on computer storage media, for processing a network input using a computer vision neural network with learned tokenization.

20 Claims, 7 Drawing Sheets

(56) References Cited

OTHER PUBLICATIONS

Cordonnier et al., "On the Relationship between Self-Attention and Convolutional Layers," ar Xiv, Jan. 10, 2020, 18 pages.
Dehghani et al., "Scenic: A JAX Library for Computer Vision Research and Beyond," Proceedings of the IEEE/CVF Conference on Computer Vision and Pattern Recognition (CVPR), Jun. 2022, pp. 21393-21398.
Deng et al., "Imagenet: A large-scale hierarchical image database," Proceedings of the IEEE Conference on Computer Vision and Pattern Recognition (CVPR), 2009, pp. 248-255.
Diba et al., "Holistic large scale video understanding," arXiv, Apr. 25, 2019, 11 pages.
Dosovitskiy et al., "An image is worth 16×16 words: Transformers for image recognition at scale," arXiv, Jun. 3, 2021, 22 pages.
Fan et al., "Multiscale vision transformers," arXiv, Apr. 22, 2021, 18 pages.
Feichtenhofer et al., "Convolutional twostream network fusion for video action recognition," Proceedings of the IEEE Conference on Computer Vision and Pattern Recognition (CVPR), Jun. 2016, pp. 1933-1941.
Feichtenhofer et al., "Slowfast networks for video recognition," Proceedings of the IEEE International Conference on Computer Vision (ICCV), Oct. 2019, pp. 6202-6211.
Feichtenhofer et al., "Spatiotemporal multiplier networks for video action recognition," Proceedings of the IEEE Conference on Computer Vision and Pattern Recognition (CVPR), Jul. 2017, pp. 4768-4777.
Feichtenhofer et al., "Spatiotemporal residual networks for video action recognition," arXiv, Nov. 7, 2016, 9 pages.
Feichtenhofer, "X3D: expanding architectures for efficient video recognition," Proceedings of the IEEE Conference on Computer Vision and Pattern Recognition (CVPR), Jun. 2020, pp. 203-213.
Girdhar et al., "Video action transformer network," Proceedings of the IEEE Conference on Computer Vision and Pattern Recognition (CVPR), 2019, pp. 244-253.
Graham et al., "Levit: A vision transformer in convnet's clothing for faster inference," Proceedings of the IEEE/CVF International Conference on Computer Vision (ICCV), Oct. 2021, pp. 12259-12269.
Hara et al., "Learning spatio-temporal features with 3d residual networks for action recognition," Proceedings of the IEEE International Conference on Computer Vision (ICCV), Oct. 2017, pp. 3154-3160.
Hu et al., "Squeeze- andexcitation networks," Proceedings of the IEEE Conference on Computer Vision and Pattern Recognition (CVPR), Jun. 2018, pp. 7132-7141.
Hussein et al., "Timeception for complex action recognition," Proceedings of the IEEE/CVF Conference on Computer Vision and Pattern Recognition (CVPR), Jun. 2019, pp. 254-263.
Jaegle et al., "Perceiver: General perception with iterative attention," Proceedings of the 38th International Conference on Machine Learning, Jul. 2021, 14 pages.
Ji et al., "3d convolutional neural networks for human action recognition," IEEE Transactions on Pattern Analysis and Machine Intelligence, Jan. 2013, 35(1):221-231.
Ji et al., "Action genome: Actions as composition of spatio-temporal scene graphs," Proceedings of the IEEE/CVF Conference on Computer Vision and Pattern Recognition (CVPR), Jun. 2020, pp. 10236-10247.
Kay et al., "The kinetics human action video dataset," arXiv, May 19, 2017, 22 pages.
Kondratyuk et al., "Movinets: Mobile video networks for efficient video recognition," Proceedings of the IEEE/CVF Conference on Computer Vision and Pattern Recognition (CVPR), Jun. 2021, pp. 16020-16030.
Korbar et al., "Scsampler: Sampling salient clips from video for efficient action recognition," Proceedings of the IEEE/CVF International Conference on Computer Vision (ICCV), Oct. 2019, pp. 6232-6242.

Lee et al., "Set Transformer: A Framework for Attention-based Permutation-Invariant Neural Networks," Proceedings of the 36th International Conference on Machine Learning, 2019, 10 pages.
Liu et al., "Swin transformer: Hierarchical vision transformer using shifted windows," Proceedings of the IEEE/CVF International Conference on Computer Vision (ICCV), Oct. 2021, pp. 10012-10022.
Liu et al., "Video swin transformer," arXiv, Jun. 24, 2021, 12 pages.
Monfort et al., "Moments in Time Dataset: one million videos for event understanding, " arXiv, Feb. 16, 2019, 8 pages.
Piergiovanni et al., "AViD dataset: Anonymized videos from diverse countries," Advances in Neural Information Processing Systems (NeurIPS), Dec. 2020, 11 pages.
Piergiovanni et al., "Evolving losses for unsupervised video representation learning," Proceedings of the IEEE/CVF Conference on Computer Vision and Pattern Recognition (CVPR), Jun. 2020, pp. 133-142.
Piergiovanni et al., "Evolving space-time neural architectures for videos," Proceedings of the IEEE/CVF International Conference on Computer Vision (ICCV), Oct. 2019, pp. 1793-1802.
Piergiovanni et al., "Tiny video networks," Applied AI Letters Journal, Oct. 13, 2021, 19 pages.
Ramachandran et al., "Stand-alone self-attention in vision models," Advances in Neural Information Processing Systems (NeurIPS), Dec. 2019, 13 pages.
Rawat et al., "Deep convolutional neural networks for image classification: A comprehensive review," Neural computation, Sep. 2017, 29(9):2352-2449.
Ryoo et al., "AssembleNet: Searching for Multi-Stream Neural Connectivity in Video Architectures," arXiv, May 27, 2020, 15 pages.
Ryoo et al., "AssembleNet++: Assembling modality representations via attention connections," Proceedings of European Conference on Computer Vision (ECCV), Nov. 12, 2020, 18 pages.
Ryoo et al., "Tokenlearner: Adaptive space-time tokenization for videos," Advances in Neural Information Processing Systems (NeurIPS), Dec. 2021, 12 pages.
Sigurdsson et al., "Hollywood in Homes: Crowdsourcing Data Collection for Activity Understanding," Proceedings of European Conference on Computer Vision (ECCV), Sep. 17, 2016, pp. 510-526.
Simonyan et al., "Two-stream convolutional networks for action recognition in videos," Advances in Neural Information Processing Systems (NeurIPS), Dec. 2014, 9 pages.
Srinivas et al., "Bottleneck transformers for visual recognition," Proceedings of the IEEE/CVF Conference on Computer Vision and Pattern Recognition (CVPR), Jun. 2021, pp. 16519-16529.
Stroud et al., "D3D: Distilled 3d networks for video action recognition," Proceedings of the IEEE/CVF Winter Conference on Applications of Computer Vision (WACV), Mar. 2020, pp. 625-634.
Sun et al., "Revisiting unreasonable effectiveness of data in deep learning era," Proceedings of the IEEE International Conference on Computer Vision (ICCV), Oct. 2017, pp. 843-852.
Tolstikhin et al., "Mlp-mixer: An all-mlp architecture for vision," arXiv, Jun. 11, 2021, 16 pages.
Touvron et al., "Going deeper with image transformers," Proceedings of the IEEE/CVF International Conference on Computer Vision (ICCV), Oct. 2021, pp. 32-42.
Tran et al., "A closer look at spatiotemporal convolutions for action recognition," Proceedings of the IEEE Conference on Computer Vision and Pattern Recognition (CVPR), Jun. 2018, pp. 6450-6459.
Tran et al., "C3d: generic features for video analysis," arXiv, Dec. 2, 2014, 10 pages.
Vaswani et al., "Attention is all you need," Advances in Neural Information Processing Systems (NeurIPS), Dec. 2017, 11 pages.
Wang et al., "Non-local neural networks," Proceedings of the IEEE Conference on Computer Vision and Pattern Recognition (CVPR), Jun. 2018, pp. 7794-7803.
Wang et al., "Pyramid vision transformer: A versatile backbone for dense prediction without convolutions," Proceedings of the IEEE International Conference on Computer Vision (ICCV), Oct. 2021, pp. 568-578.

(56) References Cited

OTHER PUBLICATIONS

Wang et al., "Videos as space-time region graphs," Proceedings of European Conference on Computer Vision (ECCV), Sep. 2018, pp. 399-417.

Weissenborn et al., "Scaling autoregressive video models," arXiv, Feb. 10, 2020, 24 pages.

Wu et al., "Long-Term Feature Banks for Detailed Video Understanding," Proceedings of the IEEE/CVF Conference on Computer Vision and Pattern Recognition (CVPR), Jun. 2019, pp. 284-293.

Wu et al., "Towards long-form video understanding," Proceedings of the IEEE Conference on Computer Vision and Pattern Recognition (CVPR), Jun. 2021, pp. 1884-1894.

Wu et al., "Visual Transformers: Token-based Image Representation and Processing for Computer Vision," arXiv, Nov. 20, 2020, 12 pages.

Xie et al., "Rethinking spatiotemporal feature learning: Speed-accuracy trade-offs in video classification," Proceedings of European Conference on Computer Vision (ECCV), Sep. 2018, pp. 305-321.

Xu et al., "Vipnas: Efficient video pose estimation via neural architecture search," Proceedings of the IEEE Conference on Computer Vision and Pattern Recognition (CVPR), Jun. 2021, pp. 16072-16081.

Yuan et al., "Tokensto-token vit: Training vision transformers from scratch on imagenet," Proceedings of the IEEE International Conference on Computer Vision (ICCV), Oct. 2021, pp. 558-567.

Zhai et al., "Scaling vision transformers," Proceedings of the IEEE/CVF Conference on Computer Vision and Pattern Recognition (CVPR), Jun. 2022, pp. 12104-12113.

Zhao et al., "Exploring self-attention for image recognition," Proceedings of the IEEE/CVF Conference on Computer Vision and Pattern Recognition (CVPR), Jun. 2020, pp. 10076-10085.

Zhou et al., "Temporal relational reasoning in videos," Proceedings of European Conference on Computer Vision (ECCV), Sep. 2018, pp. 803-818.

Zolfaghari et al., "Eco: efficient convolutional network for online video understanding," Proceedings of the European Conference on Computer Vision (ECCV), Sep. 2018, pp. 695-712.

\* cited by examiner

COMPUTER VISION NEURAL NETWORKS WITH LEARNED TOKENIZATION

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a computer vision task on a network input that includes one or more images using a computer visional neural network that includes one or more TokenLearner layers. Each TokenLearner layer is a tokenizer that receives as input a tensor and applies an input-dependent, learned transformation to the input tensor to generate a representation of the input tensor as a small number of token vectors.

The subject matter described in this specification can be implemented in particular embodiments so as to realize one or more of the following advantages.

By incorporating one or more TokenLearner layers into a computer vision neural network, the described techniques allow a visual input, e.g., an image or a video, to be processed with reduced latency and while consuming many fewer computational resources, e.g., FLOPs and memory. In particular, because the TokenLearner layer applies an input-dependent, learned transformation to the input tensor to generate a representation of the input tensor as a small number of token vectors, the subsequent layers of the neural network can include fewer parameters and perform their computation with less latency. Moreover, because the transformation is learned and input-dependent, the smaller number of token vectors can still encode the information necessary for performing a computer vision task. Therefore, the performance of the computer vision neural network does not degrade even though the computer vision neural network becomes much more computationally efficient.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that process a network input that includes one or more images using a neural network to perform a computer vision task.

Figure 1:
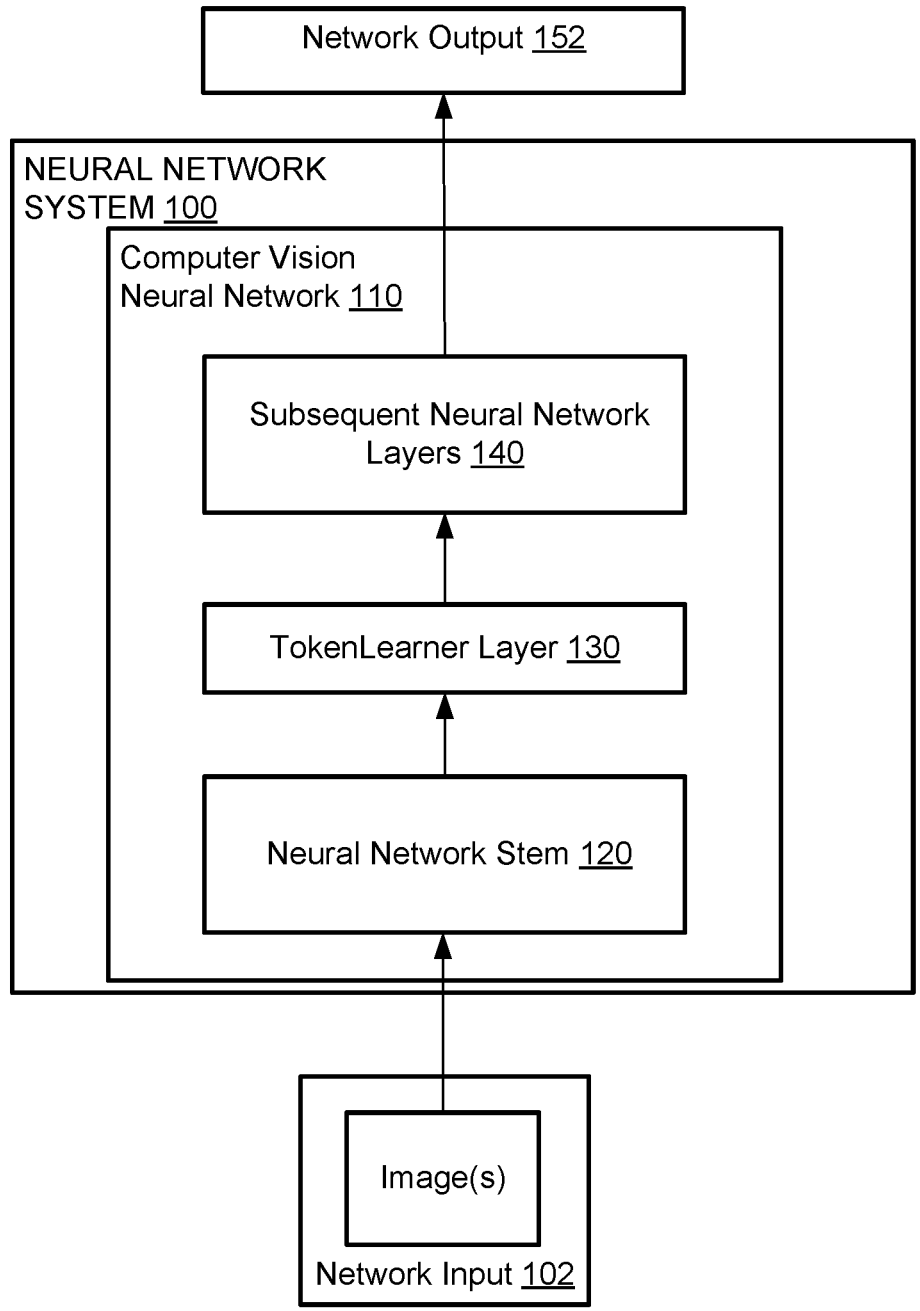
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The neural network system 100 is configured to receive a network input 102 that includes one or more images and to perform a computer vision task on the network input 102 by processing the network input 102 using a computer vision neural network 110.

The computer vision neural network 110 is configured to process the network input 102 to generate a network output 152 for the computer vision task.

Example computer vision tasks are described in more detail below.

In some cases, the network input 102 includes only a single image.

In some other cases, the network input 152 is a video, i.e., a temporal sequence of multiple images. The sequence is referred to as a "temporal" sequence because the images in the sequence are ordered according to their time of occurrence in the video.

The computer vision neural network 110 includes a neural network stem 120, a TokenLearner layer 130, and one or more subsequent neural network components 140.

The neural network stem 120 includes a set of initial neural network layers that process the network input 102 to generate an intermediate representation of the network input 102. In particular, the intermediate representation of the network input 102 is a T×H×W×C tensor, where T is the temporal dimension. That is the intermediate representation includes T frames that are each H×W×C, where H is the height of each frame, W is the width of each frame, and C is the number of channels in each frame.

When the network input 102 includes only a single image, T is equal to one and the tensor is a single H×W×C frame.

When the network input 102 includes a sequence of multiple images, T can be more than one and the tensor can include multiple H×W×C frames. In some of these implementations, T is equal to the total number of frames in the video, i.e., the tensor has the same temporal resolution as the network input 102. In others of these implementations, T is smaller than the total number of frames in the video, i.e., the neural network stem 120 reduces the temporal resolution of network input 102.

The neural network stem 120 can have any appropriate architecture that maps the network input to the intermediate representation.

For example, when the network input is a single image, the stem 120 can include one or more initial components from a Vision Transformer, i.e., can divide the image into HW patches, generate a respective token from each patch, and then process the HW tokens through one or more Transformer layer blocks that perform self-attention to update each of the tokens. The H×W×C tensor can then include the HW tokens after the last Transformer block arranged according to the positions of their corresponding patches in the image. As another example, the stem 120 can include a set of convolutional neural network layers that map the input image to the H×W×C tensor.

For example, when the network input includes multiple images, the stem 120 can include one or more initial components from a Vision Transformer configured to process videos.

For example, the Vision Transformer can divide each image into HW patches, generate a respective token from each patch, and then process the HW tokens through one or more Transformer layer blocks that perform self-attention to update each of the tokens. The T×H×W×C tensor can then include the HW tokens for each of the T images after the last Transformer block arranged according to the positions of their corresponding patches in the image.

As another example, each patch can be a spatio-temporal patch that includes pixels from multiple ones of the images, i.e., so that the video includes more than T images, and the Vision Transformer reduces the number of images to T "latent" frames when dividing the images into patches.

As another example, the stem 120 can include a set of 2D convolutional neural network layers that map each input image to an H×W×C tensor, i.e., that process each image independently.

As another example, the stem 120 can include a set of 3D convolutional neural network layers that have kernels that extend across multiple images. In some of these cases, the 3D convolutional layers preserve the temporal resolution of the video, i.e., the network input also has T images. In others of these cases, the 3D convolutional layers reduce the temporal resolution of the video, i.e., the network input has more than T images.

The TokenLearner layer 130 is a tokenizer that processes the tensor to generate a layer output that represents the T×H×W×C tensor as a set of token vectors, e.g., a set of C dimensional token vectors, that includes a fixed number S of tokens for each of the T frames in the tensor. Generally, S is much smaller than H×W, i.e., so that the layer output represents the T×H×W×C tensor using significantly fewer numerical values. For example, HW can be equal to over one thousand, while S is equal to less than one hundred, e.g., equal to eight or sixteen.

In particular, conventional schemes for tokenizing images or other image-shaped tensors divide the image into fixed size patches and then generate each token vector from the values within a corresponding fixed size patch. For example, a conventional scheme may partition an image into a fixed number of equally-sized patches.

Unlike these conventional schemes, the TokenLearner layer 130 applies a learned, input-dependent transformation to the tensor to generate the layer output. That is, rather than applying a fixed tokenization, the TokenLearner layer 130 is a tokenizer that applies a learned, input-dependent transformation to tokenize each frame in the tensor into a set of token vectors.

As used in this specification, a learned transformation (or a learned operation) is one that has parameters that are learned, i.e., adjusted, during the training of the computer vision neural network 110.

An input-dependent transformation is one that can generate different outputs for different inputs.

Thus, different intermediate representation tensors, i.e., generated from different network inputs 102, will result in token vectors that are generated by assigning different weights to different "pixels" of a given frame.

The operations performed by the TokenLearner layer 130 will be described in more detail below with reference to FIGS. 2 and 6.

The subsequent neural network components 140 receive the layer output, i.e., the S C-dimensional token vectors for each of the T frames, and process the layer output to generate the network output 152.

For example, the subsequent neural network components 140 can include a sequence of one or more Transformer layer blocks followed by a set of one or more output layers.

As another example, the computer vision neural network 110 can include more than one TokenLearner layer and the subsequent neural network components 140 can include one more additional TokenLearner layers interspersed among the sequence of Transformer layer blocks, followed by a set of one or more output layers.

Example architectures for computer vision neural networks 110 that include one or more TokenLearner layers 130 are described below with reference to FIGS. 3-5.

Prior to using the neural network 110 to perform the computer vision task, a training system trains the neural network 110 to perform the task, i.e., to determine trained values of the parameters of the neural network, including those of the TokenLearner layer(s) and, as described below, of any TokenFuser layers in the neural network 110. For example, the training system can train the neural network from scratch on training data for the task to minimize a loss function for the task, e.g., a cross-entropy loss, a negative log likelihood loss, and so on using conventional machine learning techniques. As another example, the training system can first pre-train the neural network on an unsupervised objective and then fine-tune the neural network on the training data for the task. As yet another example, the training system can train the neural network on both unlabeled data and the training data for the task through semi-supervised learning. In some cases, the system can use a different set of output layers for the pre-training, i.e., replace the output layers with those in the neural network 110 before fine-tuning on the task.

During training, the training system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the neural network in parallel. Moreover, as described above, the system can first pre-train the neural network on a large unsupervised data set through unsupervised learning, e.g., to minimize a BERT loss or other unsupervised loss, and then fine-tune the neural network on task-specific training data to optimize the loss function for the task.

Figure 2:
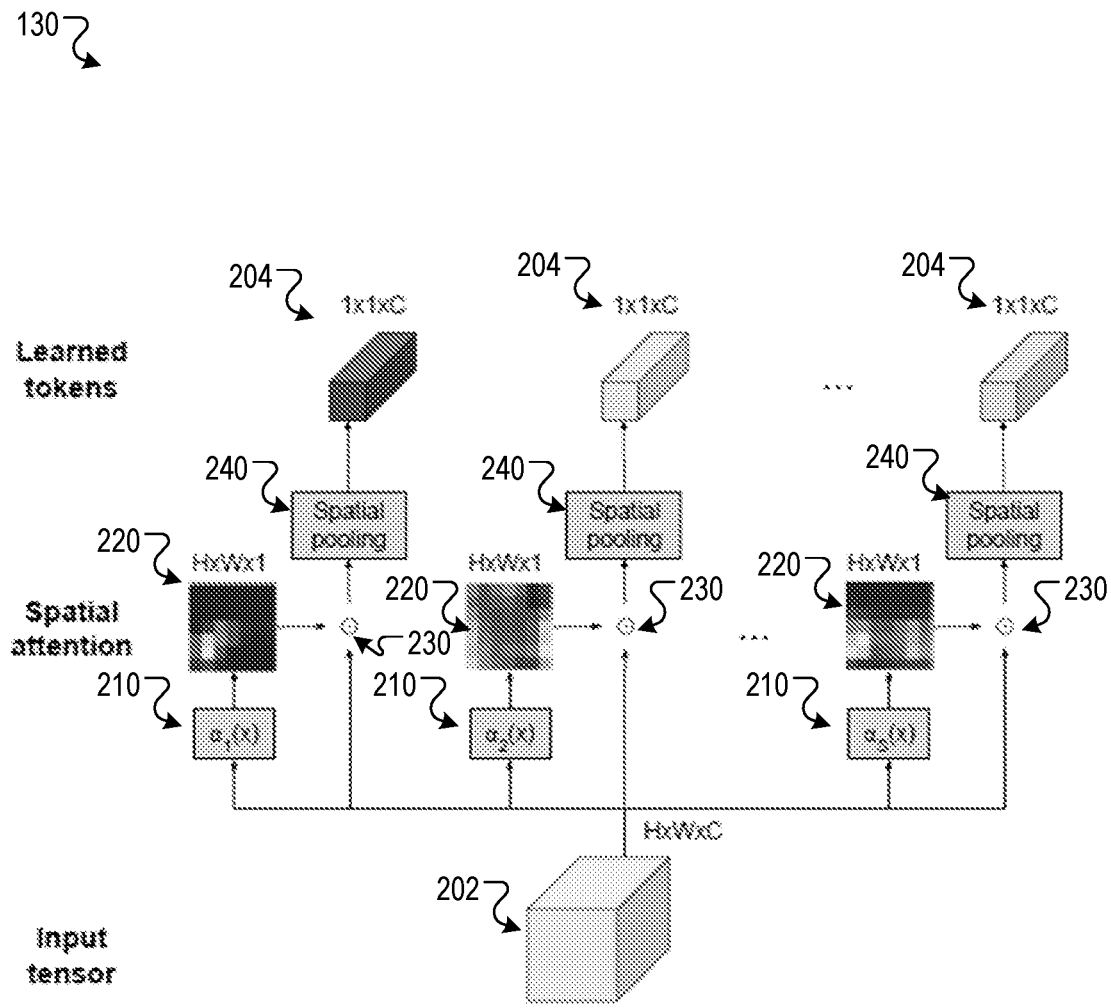
FIG. 2 shows the processing of an input by a TokenLearner layer.

FIG. 2 shows the operations performed by the TokenLearner layer 130 for a frame 202 in the input tensor to map the frame 202 to a set of S token vectors 204. As shown in the example, the frame 202 is an H×W×C frame and each of the S token vectors is a 1×1×C tensor, i.e., a vector that has C entries. Each of the S token vectors 204 has a corresponding index s, with s ranging from 1 to S.

When there are multiple frames 202 in the input tensor, the TokenLearner layer 130 applies the same set of operations to each of the multiple frames 202 to generate a respective set of S token vectors 204 for each of the frames 202.

Generally, for each index s, the layer 130 performs spatial attention over the frame 202 by generating a respective attention weight for each spatial location in the frame 202 and then applying the attention weights to generate an attended frame.

In particular, for each index s, the layer 130 applies a learned transformation 210 for the index to the frame 202 to generate an intermediate weight tensor having the same spatial dimension as the frame 202, i.e., an H×W×C weight tensor.

To apply the learned transformation 210, the layer 130 first generates an H×W×1 attention map 220 that includes a respective attention weight for each of the H×W spatial locations by applying a spatial attention operation a, to the frame 202.

The spatial attention operation as can be any of a variety of operations that have parameters that are learned during the training of the computer vision neural network.

As one example, the layer 130 can implement the respective spatial attention operations for all of the S indices as a single series of one or more convolutional layers that take an H×W×C tensor as input and generate as output an H×W×S tensor, with each of the S channels in the output being the attention map for a different one of the S indices. To ensure that each value in the H×W×S tensor is a "weight" that is between 0 and 1, the last convolutional layer in the series can have a sigmoid activation function.

As another example, the spatial attention operation as can be a multi-layer perceptron (MLP), i.e., so that each of the S indices has a corresponding MLP with different parameters. The MLPs can have any appropriate MLP architecture. As a particular example, each MLP can be made up of two linear layers separated by an activation function, e.g., a gelu activation function.

The layer 130 then "broadcasts" the attention weights along the channel dimension to generate the H×W×C intermediate weight tensor. That is, for any given spatial location, the C values at the spatial location are each the same attention weight, i.e., each equal to the attention weight at the given spatial location in the H×W×1 attention map 220.

For each index s, the layer 130 then computes an element-wise product 230 between the intermediate weight tensor for the index and the frame 202. Computing an element-wise product refers to multiplying each element of the intermediate weight tensor with the corresponding element of the frame 202, i.e., so that for each index h×w×c, the element at index h×w×c in the intermediate weight tensor is multiplied by the element at index h×w×c in the frame 202.

For each index s, the layer 130 then generates the token at the index from the element-wise product 230 for the index. For example, as shown in FIG. 2, the layer 130 can apply spatial global average pooling 240 to reduce the element-wise product from H×W×C to 1×1×C. In spatial global average pooling 240, for each of the C channels, the layer 130 averages the H×W values in that channel to generate a single value for the channel.

Thus, the operations of the layer 130 to generate the token vector $z_i$ at index i can satisfy:

$$z_i = \rho(X_t \odot A_{iw}),$$

where $\rho$ is the spatial global average pooling operation, $X_t$ is the frame 202, $\odot$ represents element-wise multiplication, and $A_{iw}$ is the intermediate weight tensor for index i. In turn, $A_{iw}$ can satisfy:

$$A_{iw} = \gamma(\alpha_i(X_t)),$$

where $\gamma$ is the broadcast operation.

Figure 3:
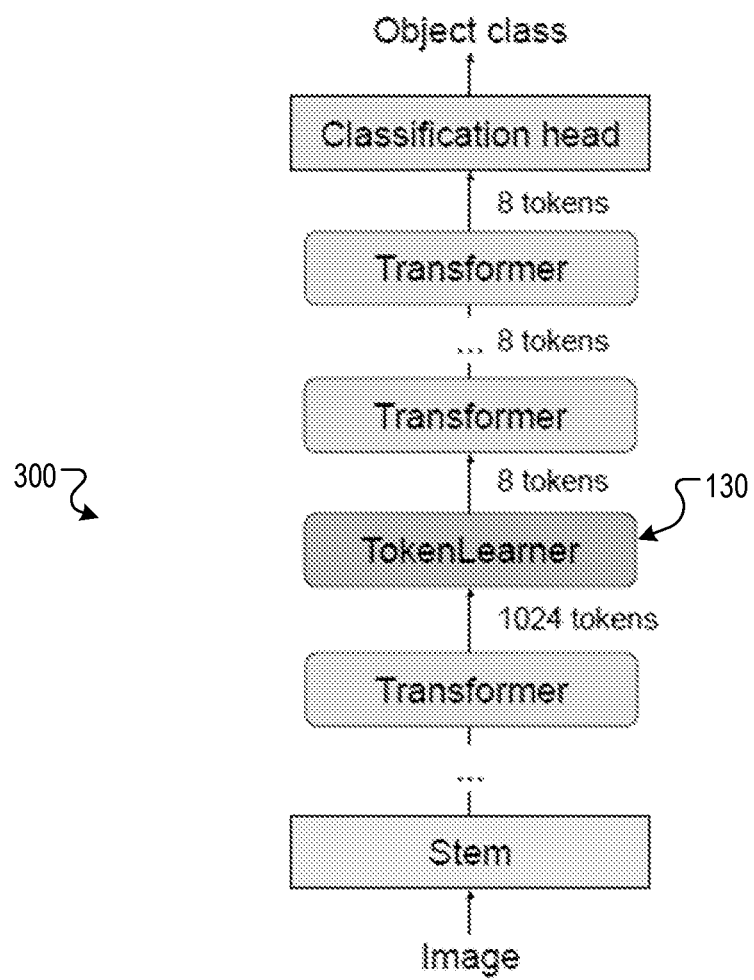
FIG. 3 shows one example architecture of the computer vision neural network.

FIG. 3 shows one example of an architecture of a computer vision neural network 300 that has a single Token-Learner layer 130.

As shown in FIG. 3, the computer vision neural network 300 is configured to perform a classification task on a network input that includes a single image.

As shown in FIG. 3, the computer vision neural network includes a stem subnetwork that includes a set of stem neural network layers and a final Transformer layer block and that receives the input image and generates a representation of the input image as a set of 1024 C dimensional tokens that each correspond to a different patch of the input image.

The neural network 300 also includes a TokenLearner layer that receives the set of 1024 tokens (represented as an H×W×C tensor) and generates, as output, a set of 8 tokens. That is, the neural network 300 represents the set of tokens generated by the final Transformer layer block as an H×W×C tensor by arranging the tokens based on the location in the input image of the patch corresponding to each of the tokens. For example, the 1024 tokens can be represented as a 32×32×C tensor when the input image is a square and each patch corresponds to an equal sized region of the image.

The neural network 300 also includes a set of subsequent layers that include additional Transformer layer blocks and a classification neural network head, e.g., that includes one or more fully connected layers, e.g., linear layers, and, optionally, a softmax layer or a logistic layer.

The Transformer layer blocks in the neural network 300 can be any appropriate Transformer block that apply attention over the tokens that are received as input by the layer block. For example, the block can be a Transformer layer block from a Vision Transformer (described in Dosovitskiy, et al., An Image is Worth 16×16 Words: Transformers for Image Recognition at Scale, arXiv:2010.11929) or a vector Transformer block (described in H. Zhao, J. Jia, and V. Koltun. Exploring self-attention for image recognition. In Proceedings of the IEEE Conference on Computer Vision and Pattern Recognition (CVPR), June 2020.

Because of the TokenLearner layer 130, the set of subsequent layers are only required to process sequences of 8 tokens, instead of sequences of 1024 tokens, while still operating on an input that represents the entire image. Therefore, the amount of computational resources is significantly reduced without a corresponding loss of accuracy relative to conventional Transformer neural networks that would process the same length sequence at every Transformer layer block in the neural network.

While the architecture shown in FIG. 3 includes a single TokenLearner layer 130, in other implementations, the neural network can include multiple TokenLearner layers 130.

For example, one TokenLearner layer 130 can reduce the initial set of tokens to a first reduced number, e.g., 1024 tokens to 512 tokens, be followed by one or more Transformer layers that operate on the first reduced number of tokens, and another TokenLearner layer 130 can further reduce the set of tokens to a further reduced set of tokens, e.g., from 512 tokens to 8 tokens, and be followed by one or more additional Transformer layer blocks and an output head.

As another example, each of the multiple TokenLearner layers 130 can be accompanied by another layer that increases the dimensions of the representation generated by the TokenLearner layer 130 (after the representation has been processed by one or more intermediate layers).

Figure 4:
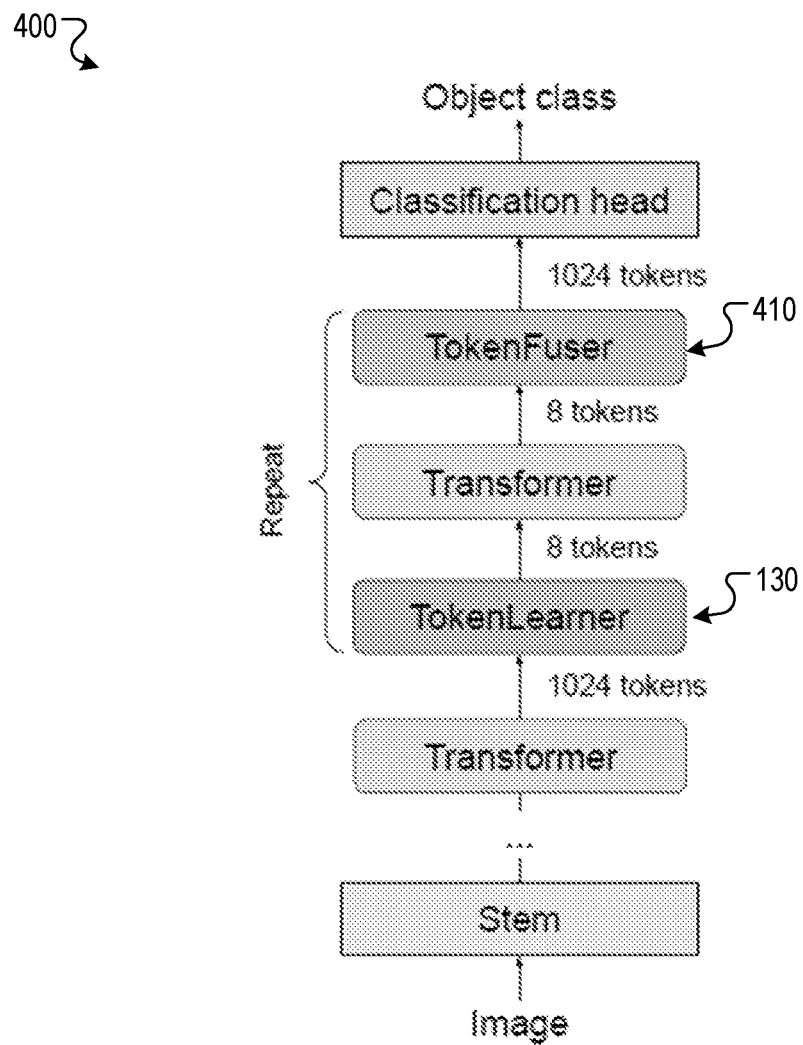
FIG. 4 shows another example architecture of the computer vision neural network.

One example of such an architecture is shown in FIG. 4.

FIG. 4 shows another example architecture of a computer vision neural network 400 that includes multiple TokenLearner layers 130.

As shown in FIG. 4, each TokenLearner layer 130 is followed by one or more subsequent components that maintain the dimensionality of the output of the TokenLearner layer. In the example of FIG. 4, the subsequent components are a Transformer layer block that maintains the dimensionality of the output of the TokenLearner layer.

The one or more subsequent components are then followed by a TokenFuser layer 410 that remaps the token vector representation back to the original, higher spatial resolution that was provided as input to the TokenLearner layer 130.

In some examples, the TokenFuser layer 410 uses the masks from the TokenLearner module to 'unpool' the output tokens.

In some other examples, the TokenFuser layer 410 can use one more Transformer layers to increase the number of tokens back to the original number of tokens In yet other examples, the TokenFuser layer 410 operates as described below with reference to FIG. 5.

By including the TokenFuser layer 410 after the subsequent component(s), the spatial structure of the network input can be maintained throughout the network while still allowing computationally expensive components, i.e., Transformer layer blocks, to operate on significantly reduced numbers of tokens. This enables the neural network to capture spatio-temporal 'patterns' formulated by the tokens processed by various components of the neural network.

The combination of TokenLearner layer—subsequent component(s)—TokenFuser layer can be repeated several times to form the complete architecture 400 as shown in FIG. 4.

Figure 5:
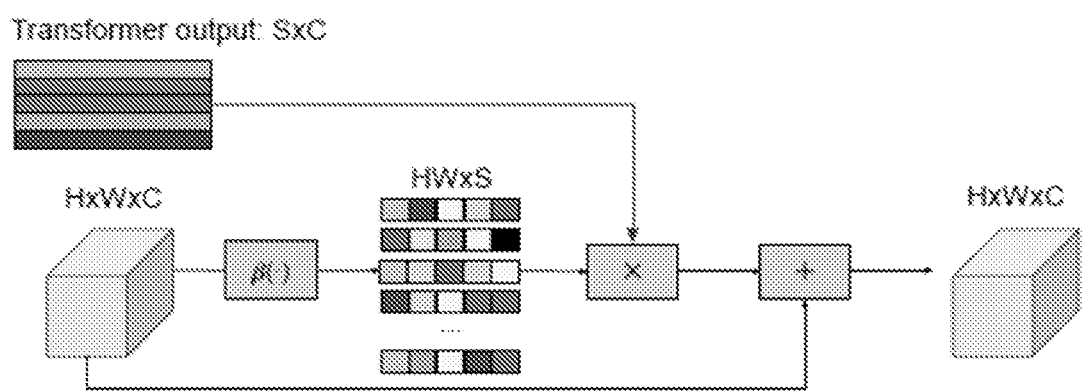
FIG. 5 shows the processing of an input by a TokenFuser layer.

FIG. 5 shows the operations performed by the TokenFuser layer 410.

Generally, the TokenFuser layer 410 fuses information across token vectors and remaps the token vector representation back to an original, higher spatial resolution. That is, the TokenFuser layer 410 maps a representation that includes T sets of S C dimensional token vectors to a T×H×W×C tensor.

In particular, the TokenFuser layer 410 operates on a token tensor Y that has dimensions ST X C, i.e., that represents the T*S total C-dimension token vectors and that is generated as output of an intermediate layer that is between the TokenFuser layer 410 and a corresponding TokenLearner layer, e.g., as output of a Transformer layer in the example of FIG. 3 above.

The TokenFuser layer 410 applies a fusion operation that fuses operation across token vectors. In particular, the layer 410 applies the fusion operation independently to each channel of the token tensor Y, so that, for a given one of the C channels, the fusion operation receives as input each value that is in the given channel in each of the T*S token vectors and updates the value in the given channel for each of the token vectors using the input. Thus, when T is greater than 1, the TokenFuser layer 410 fuses information across both temporal and spatial dimensions of the network input.

For example, the fusion operation can be a linear layer, e.g., a fully connected MLP layer) that is applied over the tokens, not channels. That is, the fusion operation can update Y as $Y=(Y^T M)^T$ where M is a learned weight matrix with size ST×ST. The result of such operation maintains the tensor size of ST x C, i.e., so that the updated tensor Y includes a respective updated value for each original value in Y that is updated using only the original values that have the same channel index as the original value.

The TokenFuser layer 410 then remaps each temporal slice Yt of the updated tensor Y, i.e., each set of updated token vectors for each of the T frames, back to H×W×C, i.e., to the same dimensions as the input to the corresponding TokenLearner layer.

That is, after fusing information across the sets of token vectors for each of the frames, the TokenFuser layer 410 remaps each set of token vectors to the same dimensions as the original frame.

In some implementations, the TokenFuser layer 410 can use a fixed mapping to remap the set of token vectors.

In some other implementations, the TokenFuser layer 410 can remap the set of token vectors using a respective learned combination operation for each of the spatial locations in H×W. That is, during training, the TokenFuser layer 410 learns to combine values from the token tensor differently for each spatial position.

As a particular example, the learned combination operation can be a matrix product between an intermediate weight tensor and the remapped tensor $X_t^{j+1}$ for frame t can satisfy:

$$X_t^{j+1} = B_w Y_t + X_t^j$$

where $B_w$ is the intermediate weight tensor, $Y_t$ is the token tensor for frame t, and $X_t^j$ is frame t from the input tensor to the corresponding TokenLearner layer.

To generate the intermediate weight tensor, the TokenFuser layer can process $X_t^j$ using a learned operation. For example, the learned operation can be a linear neural network layer followed by a sigmoid activation function or another learned operation that generates, as output, an HW×C tensor that can serve as the intermediate weight tensor.

Thus, the TokenFuser layer 410 receives an input that has the same dimensionality as the output of the corresponding TokenLearner layer and generates an output that has the same dimensionality as the input to the corresponding TokenLearner layer.

Figure 6:
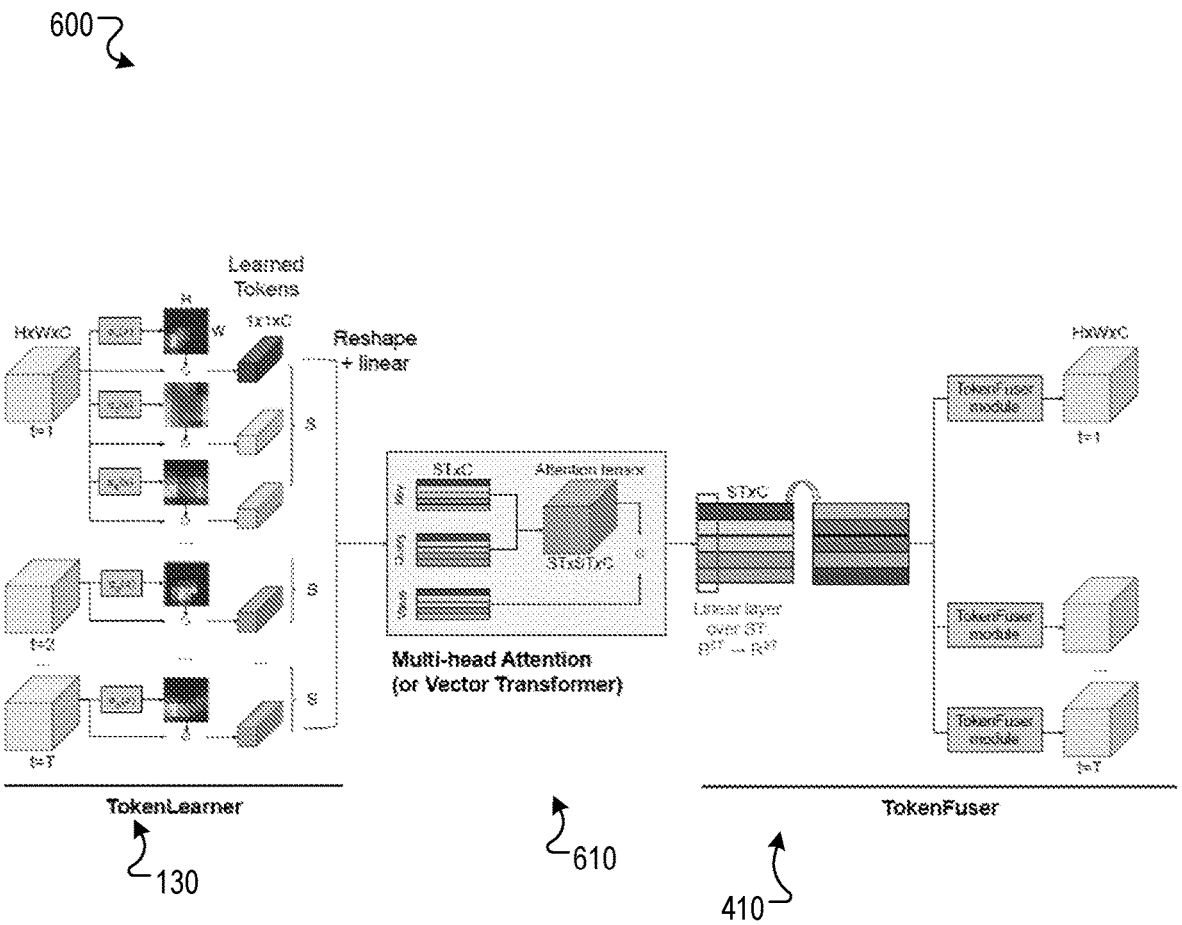
FIG. 6 shows another example architecture of the computer visional neural network for processing videos.

FIG. 6 shows an example of an architecture of a combination of a TokenLearner layer 120, a Transformer layer block 610, and a TokenFuser layer 410 that can be inserted within a computer vision neural network for processing videos.

As shown in FIG. 6, the TokenLearner layer 120 receives as input T H×W×C tensors and generates a respective set of S 1×1×C token vectors for each of the T frames.

The computer vision neural network then processes the token vectors using the Transformer layer block 610 to update each token vector while maintaining the dimensionality of the token vectors, i.e., so that the output of the block is also a set of S 1×1×C token vectors.

The Transformer layer block can be any appropriate Transformer block that applies attention over the tokens. For example, the block can be a Transformer layer block from a Vision Transformer or a vector Transformer block.

The TokenFuser layer 410 then fuses information across frames and remaps the token vectors to the original T×H×W×C tensor.

While only a single combination of a TokenLearner layer 130, a Transformer layer block 610, and a TokenFuser layer 410 are shown in FIG. 6, in some cases, these are repeated multiple times in the computer vision neural network, e.g., as shown above in FIG. 4.

Figure 7:
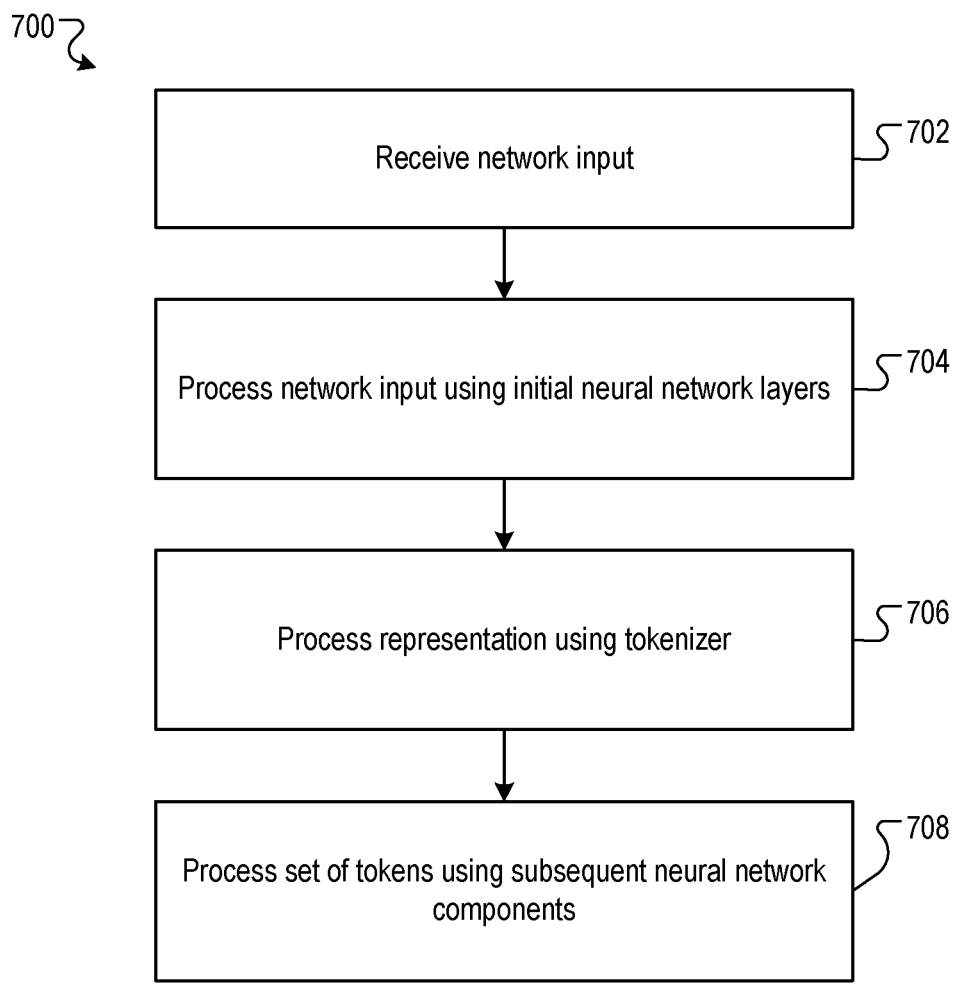
FIG. 7 is a flow diagram of an example process for processing a network input to perform a computer vision task.

FIG. 7 is a flow diagram of an example process 700 for performing a computer vision task on a network input. For convenience, the process 700 will be described as being performed by a system of one or more computers located in one or more locations. For example, a neural network system, e.g., the neural network system 100 depicted in FIG. 1, appropriately programmed in accordance with this specification, can perform the process 400.

The system receives a network input that includes one or more images (step 702). In some cases, the input includes only a single image. In other cases, the input is a sequence of multiple images, e.g., video frames from a video.

The system processes the network input using one or more initial neural network layers to generate a representation of the network input (step 704). For example, the system can process the network input using a neural network stem as described above. The representation includes a set of T input frames, where each input frame is an H×W×C tensor.

The system applies a tokenizer (also referred to as a TokenLearner layer) to the respective frames to map each frame to a fixed number of token vectors (step 706). As described above, the tokenizer applies a learned, input-dependent transformation to each frame to map the frame to a set of token vectors.

The system processes the token vectors for the one or more input images using one or more subsequent neural network components to generate the network output for the one or more input images (step 708).

The neural network can be configured to perform any appropriate computer vision machine learning task with respect to the network input, e.g., a classification task, a regression task, or a combination thereof.

As a particular example, the neural network can be configured to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the neural network can be configured to generate a pixel-level classification output that includes, for each pixel in the image, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the neural network can be configured to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box. For example, the system may output the (x, y) coordinates of two of the coordinates of the bounding box or can output the coordinates of the center of the bounding box and the height and width of the bounding box.

In some implementations, the neural network can be configured to perform a video analysis task, e.g., an action recognition task or a topic recognition task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a network input comprising one or more input images;
   processing the one or more input images using one or more initial neural network layers of a computer vision neural network to generate an intermediate tensor that comprises one or more frames, each frame being an H×W×C tensor that includes HW C dimensional tokens;
   applying a tokenizer to the respective frames to map each frame to a fixed number of token vectors, wherein the tokenizer applies a learned, input-dependent transformation having parameters that were adjusted during training of the computer vision neural network to each frame to map the frame to a set of token vectors that is a set of S token vectors that are each C dimensional, wherein S is less than HW and wherein the parameters of the input-dependent transformation were adjusted during the training such that the S token vectors encode information that enables performing a computer vision task despite being less than HW; and
   processing the token vectors for the one or more frames using one or more subsequent neural network components of the computer vision neural network to generate a network output for the computer vision task for the one or more input images.

2. The method of claim 1, wherein each token in the set has a respective index, and wherein applying the learned, input-dependent transformation comprises, for each frame and for each index, generating the token vector having the index by:
   applying a learned transformation for the index to the frame to generate an intermediate weight tensor having a same spatial dimension as the frame;
   computing an element-wise product between the intermediate weight tensor and the frame; and
   generating the token from the element-wise product.

3. The method of claim 2, wherein applying a learned transformation to the frame to generate an intermediate weight tensor having the same spatial dimension as the frame comprises:
   applying the learned transformation to the frame to generate a weight feature map; and
   generating the intermediate weight tensor by applying a broadcast operation to the weight feature map.

4. The method of claim 2, wherein the learned transformation for the index is an MLP.

5. The method of claim 2, wherein the learned transformation for the indices is one or more convolutional layers that are applied to the frame to generate an output feature map that has a respective channel corresponding to each index.

6. The method of claim 2, wherein generating the token from the element-wise product comprises:
   generating the token by applying spatial global average pooling to the element-wise product to reduce a dimensionality of the element-wise product.

7. The method of claim 1, wherein HW is greater than 1000 and S is less than 100.

8. The method of claim 1, wherein processing the token vectors for the one or more frames using one or more subsequent neural network components to generate a network output for a computer vision task for the one or more input images comprises:
   processing the token vectors using one or more Transformer layer blocks.

9. The method of claim 1, wherein processing the token vectors for the one or more frames using one or more subsequent neural network components to generate a network output for a computer vision task for the one or more input images comprises:
   processing the token vectors using a first subsequent neural network component that updates each of the token vectors to generate updated token vectors for the one or frames; and
   processing the updated token vectors using another neural network component that generates an updated intermediate tensor that comprises one or more updated frames, each updated frame being an H×W×C tensor that includes HW C dimensional tokens.

10. A system comprising one or more computers and one or more storage devices storing instructions that when executed by one or more computers cause the one or more computers to perform operations comprising:
    receiving a network input comprising one or more input images;
    processing the one or more input images using one or more initial neural network layers of a computer vision neural network to generate an intermediate tensor that comprises one or more frames, each frame being an H×W×C tensor that includes HW C dimensional tokens;
    applying a tokenizer to the respective frames to map each frame to a fixed number of token vectors, wherein the tokenizer applies a learned, input-dependent transformation having parameters that were adjusted during training of the computer vision neural network to each frame to map the frame to a set of token vectors that is a set of S token vectors that are each C dimensional, wherein S is less than HW and wherein the parameters of the input-dependent transformation were adjusted during the training such that the S token vectors encode information that enables performing a computer vision task despite being less than HW; and
    processing the token vectors for the one or more frames using one or more subsequent neural network components of the computer vision neural network to generate a network output for the computer vision task for the one or more input images.

11. The system of claim 10, wherein each token in the set has a respective index, and wherein applying the learned, input-dependent transformation comprises, for each frame and for each index, generating the token vector having the index by:
- applying a learned transformation for the index to the frame to generate an intermediate weight tensor having a same spatial dimension as the frame;
- computing an element-wise product between the intermediate weight tensor and the frame; and
- generating the token from the element-wise product.

12. The system of claim 11, wherein applying a learned transformation to the frame to generate an intermediate weight tensor having the same spatial dimension as the frame comprises:
- applying the learned transformation to the frame to generate a weight feature map; and
- generating the intermediate weight tensor by applying a broadcast operation to the weight feature map.

13. The system of claim 11, wherein the learned transformation for the index is an MLP.

14. The system of claim 11, wherein the learned transformation for the indices is one or more convolutional layers that are applied to the frame to generate an output feature map that has a respective channel corresponding to each index.

15. The system of claim 11, wherein generating the token from the element-wise product comprises:
- generating the token by applying spatial global average pooling to the element-wise product to reduce a dimensionality of the element-wise product.

16. The system of claim 10, wherein HW is greater than 1000 and S is less than 100.

17. The system of claim 10, wherein processing the token vectors for the one or more frames using one or more subsequent neural network components to generate a network output for a computer vision task for the one or more input images comprises:
- processing the token vectors using one or more Transformer layer blocks.

18. The system of claim 10, wherein processing the token vectors for the one or more frames using one or more subsequent neural network components to generate a network output for a computer vision task for the one or more input images comprises:
- processing the token vectors using a first subsequent neural network component that updates each of the token vectors to generate updated token vectors for the one or frames; and
- processing the updated token vectors using another neural network component that generates an updated intermediate tensor that comprises one or more updated frames, each updated frame being an H×W×C tensor that includes HW C dimensional tokens.

19. One or more non-transitory computer-readable storage media storing instructions that when executed by one or more computers cause the one or more computers to perform operations comprising:
- receiving a network input comprising one or more input images;
- processing the one or more input images using one or more initial neural network layers of a computer vision neural network to generate an intermediate tensor that comprises one or more frames, each frame being an H×W×C tensor that includes HW C dimensional tokens;
- applying a tokenizer to the respective frames to map each frame to a fixed number of token vectors, wherein the tokenizer applies a learned, input-dependent transformation having parameters that were adjusted during training of the computer vision neural network to each frame to map the frame to a set of token vectors that is a set of S token vectors that are each C dimensional, wherein S is less than HW and wherein the parameters of the input-dependent transformation were adjusted during the training such that the S token vectors encode information that enables performing a computer vision task despite being less than HW; and
- processing the token vectors for the one or more frames using one or more subsequent neural network components of the computer vision neural network to generate a network output for the computer vision task for the one or more input images.

20. The one or more non-transitory computer-readable storage media of claim 19, wherein each token in the set has a respective index, and wherein applying the learned, input-dependent transformation comprises, for each frame and for each index, generating the token vector having the index by:
- applying a learned transformation for the index to the frame to generate an intermediate weight tensor having a same spatial dimension as the frame;
- computing an element-wise product between the intermediate weight tensor and the frame; and
- generating the token from the element-wise product.

* * * * *